US008316706B2

(12) United States Patent
Glocker

(10) Patent No.: US 8,316,706 B2
(45) Date of Patent: Nov. 27, 2012

(54) CONNECTING ELEMENT FOR CONNECTING A MEASUREMENT RECORDER TO A SEALED FLUID SYSTEM

(75) Inventor: Raymond Glocker, Aschaffenburg (DE)

(73) Assignee: Sartorius Stedim Biotech GmbH, Gottingen (DE)

( * ) Notice: Subject to any disclaimer, the term of this patent is extended or adjusted under 35 U.S.C. 154(b) by 0 days.

(21) Appl. No.: 12/933,183

(22) PCT Filed: Mar. 12, 2009

(86) PCT No.: PCT/EP2009/001757
§ 371 (c)(1),
(2), (4) Date: Sep. 17, 2010

(87) PCT Pub. No.: WO2009/115223
PCT Pub. Date: Sep. 24, 2009

(65) Prior Publication Data
US 2011/0011176 A1 Jan. 20, 2011

(30) Foreign Application Priority Data
Mar. 20, 2008 (DE) .......................... 10 2008 015 322

(51) Int. Cl.
G01F 15/14 (2006.01)
(52) U.S. Cl. .......................................................... 73/201
(58) Field of Classification Search .................... 73/201, 73/715, 706, 730
See application file for complete search history.

(56) References Cited

U.S. PATENT DOCUMENTS
4,109,535 A 8/1978 Reed et al.
(Continued)

FOREIGN PATENT DOCUMENTS
DE 3525536 1/1987
(Continued)

OTHER PUBLICATIONS
German language article—Buchwalsky, Rainer and Reindell, Geleitwort von H, "Einschwemmkatheter: Technik, Auswertung und praktische Konsequenzen", Erlangen: perimed Fachbuch-Verlagsgesellschaft, 1985, pp. 106-109.
(Continued)

Primary Examiner — Jewel V Thompson
(74) Attorney, Agent, or Firm — Grossman Tucker Perreault & Pfleger, PLLC

(57) ABSTRACT

A system element for releasably sealed connecting of a measurement recorder to a fluid system, having a measurement chamber that can be connected to the fluid system allowing flow through the same, wherein the measurement chamber is formed in a housing and a part of the wall of the measurement chamber is formed by a membrane, wherein the part of the wall adjacent to the membrane forms an outer wall having an edge whereon the membrane bears, and the membrane comprises a circumferential bead facing the measurement chamber, wherein the bead engages in a recess formed in the housing about the outer wall; and running around the measurement chamber, and protruding pins are disposed in the region of the recess about the outer wall, and wherein holes are provided in the bead of the membrane, so that the pins engage in the holes in the bead of the membrane.

18 Claims, 7 Drawing Sheets

U.S. PATENT DOCUMENTS

| | | | |
|---|---|---|---|
| 4,163,964 A * | 8/1979 | De Filippis | 338/215 |
| 6,880,404 B2 | 4/2005 | Uberreiter | |
| 2003/0200812 A1 * | 10/2003 | Kuhn et al. | 73/715 |
| 2004/0135666 A1 | 7/2004 | Kurtz et al. | |

FOREIGN PATENT DOCUMENTS

| | | |
|---|---|---|
| DE | 4219888 | 1/1994 |
| DE | 9317751 | 3/1994 |
| EP | 0330891 | 9/1989 |
| WO | WO02/03854 | 1/2002 |

OTHER PUBLICATIONS

PCT International Search Report dated Jul. 24, 2009, received in corresponding PCT Application No. PCT/EP2009/001757, 3 pgs.

PCT Translation of Int Preliminary Rpt on Patentabillity and Written Opinion dated Oct. 5, 2010, received in corresponding PCT Application No. PCT/EP2009/001757, 10 pgs.

\* cited by examiner

CONNECTING ELEMENT FOR CONNECTING A MEASUREMENT RECORDER TO A SEALED FLUID SYSTEM

CROSS-REFERENCE TO RELATED APPLICATIONS

This application is the U.S. National Phase Application under 35 U.S.C. §371 of International Patent Application No. PCT/EP2009/001757 filed Mar. 12, 2009, which designated the United States and was published as WO 2009/115223A1 on Sep. 24, 2009 in a language other than English, which claims the benefit of German Patent Application No. 10 2008 015 322.2 filed on Mar. 20, 2008, both of which are incorporated by reference herein.

BACKGROUND

The invention relates to a system element for the releasable sealed connection of a measurement recorder to a fluid system, with a measuring chamber that can be connected to the fluid system in such a way as to allow through-flow, wherein the measuring chamber is formed in a housing, and a part of the wall of the measuring chamber is formed by a membrane that is substantially more flexible than the remainder of the wall of the measuring chamber, wherein the part of the wall of the measuring chamber adjacent to the membrane forms an outer wall with an edge on which the membrane bears, and the membrane has a circumferential bead located on that side of the membrane facing the measuring chamber.

Such system elements are known in medical technology by the colloquial term "dome" or "pressure dome", which originates from the dome-shaped design of the measuring chamber. A measurement recorder, to which such a dome is usually connected in order to measure or monitor pressure, is known by the term "transducer", which is understood to mean a measuring converter which is located in a suitable housing and by which the pressures and pressure changes usually transmitted via the membrane of the pressure dome are converted to an electrical signal. They have hitherto been used to permit the measurement of pressures in liquids during the examination and treatment of humans and animals, preferably by means of electronic diagnostic and monitoring equipment. The advantage of such an arrangement lies in the possibility of configuring the system element as an inexpensive and easily disposable part and of ensuring that the fluid system is sealed securely and hygienically.

For monitoring pressure during the flushing of body cavities, DE 42 19 888 A1, for example, describes a flow pressure transducer with a connecting element of this kind that is designed for large volume throughput in accordance with the intended area of use.

For monitoring the hemodynamic parameters of a patient, in particular of intensive-care patients, it is customary nowadays, in addition to recording an ECG, also to record the invasive pressures in the patient monitoring, that is to say keep a check on the state of the vital bodily functions of the patient. Depending on the degree of monitoring, between one and four pressures (arterial, pulmonary-arterial, LAP and venous) are measured.

For this purpose, a catheter with an integrated monitoring set is used. The positioning of the end opening of the catheter defines the measuring point in the patient's body. A monitoring set refers to an assembly of parts that establish the connections between the patient and the so-called monitor and, usually for reasons of hygiene, are intended for once-only use. A monitor refers to the electronic monitoring and recording system with which the corresponding measured data are evaluated and displayed, and which if necessary emits corresponding alarm signals if measured data leave predetermined target ranges.

A general description of this, taking the example of an examination by a flow-directed catheter, is found in Buchwalsky, Rainer: Einschwemmkatheter: Technik, Auswertung u. prakt. Konsequenzen [Flow-directed catheters: technology, evaluation and practical consequences] (Beiträge zur Kardiologie [Articles on cardiology], vol. 29); Erlangen: perimed Fachbuch-Verlagsgesellschaft, 1985, pages 106-109.

The monitoring set to be secured to the catheter comprises an unventilated infusion appliance for delivering infusion solutions to the patient, a flushing system, which ensures a continuous flushing rate of usually 3 ml/h at the catheter tip in order to avoid occlusion by blood clots, if appropriate with a quick-flush function for special cases, and with a pressure dome. The pressure dome transmits the pressure signal via its flexible membrane to a reusable transducer (pressure sensor). Such a pressure dome has hitherto been secured on such a transducer by a screw connection or bayonet connection (see DE 42 19 888 A1, column 3, lines 28 to 30).

Further elements of a monitoring set are the pressure hoses (identified by colors) and possibly a three-way cock, to allow medicaments to be delivered, or a blood sampling system for withdrawing blood for further examinations.

Disposable transducers that contain the pressure-measuring sensor in a flow housing are designed in the form of a simple tube in the flow chamber in order to avoid the trapping of air bubbles, which in particular greatly impairs the dynamic measuring properties. However, they have the disadvantage that the valuable electronics are integrated in the disposable article and are therefore thrown away each time the monitoring set is changed and have to be disposed of along with the latter. To comply with hygiene requirements, such an exchange must take place at the latest every second day. This entails not only the disadvantage that the still functional electronics are replaced with every change, accompanied by corresponding costs, but also that the presence of electronic components requires additional special, and consequently cost-intensive, treatment as electronic scrap during disposal.

For this reason, dome systems that can be used repeatedly are becoming more popular, at least in Europe. The valuable electronics, in particular the pressure sensor, are located in a special housing. Such a part is usually referred to as the transducer. One or more transducers are integrated in a special retaining plate. The retaining plate is secured, for example on an infusion stand, by means of a clamping device or screwing device. The measured pressure data are transmitted from the transducers in the retaining plate to the monitor via one or more cables.

When in the past it was necessary to mount a twin or even triple monitoring set on a number of transducers using the screw or bayonet connection usually found in the case of repeatedly reusable transducers, the turning movements necessary for this were possible only to a limited extent in the first transducer. When mounted on the second transducer, the presence of the structure on the first transducer was already a hindrance. Mounting a second dome onto the second transducer was not possible without removing the transducer from a common retaining plate.

This complicated handling is not only troublesome, it also represents an absolute obstacle to designing retaining plates with permanently fitted transducers and rear-side cabling.

This problem is also not solved by a system element of the type described in DE 35 25 536 A1. In the latter, and in EP 0 208 955 A2, it is proposed to avoid damage in particular to the membrane of the connecting element by providing a securing arrangement in which it is not necessary for connecting element and transducer to be turned in relation to each other. For this purpose, additional securing elements, such as pivotably mounted clamps or closing hooks elements, are to be provided at two locations on the circumference of the housing of the connecting element.

It is proposed there to allow these securing elements or continuations to protrude downward beyond the membrane for the handling of the securing elements. This is intended to make it possible to check visually that the securing element provided has also been locked. This is also intended to simplify handling when removing the connecting element from the transducer. However, a combination with transducers secured in retaining plates is in practice ruled out.

Moreover, according to the teaching of said document, the housings of the pressure dome and transducer are intended to touch each other directly (see column 9/10 therein), as a result of which the membranes of the pressure dome and transducer are intended to lie "snugly on each other", but a prestressing of the membranes is considered disadvantageous and is to be avoided (loc. cit., column 4, line 21 et seq.).

EP 0 701 830 A1 describes a device and a method preferably for use in the area of pressure measurement in blood-conveying lines of dialysis equipment, for hemofiltration and hemodiafiltration. For this purpose, the pressure is to be measured indirectly via a gas column (air), which is in connection with the liquid column in a line via an elastic membrane located in a housing. The pressure of the gas column is recorded by suitable and customary sensors (pressure pick-ups). To extend the restriction of the measuring range caused by the mechanically limited deflectability of the membrane and the compressibility of the gas column, a device and a method are proposed with which the amount of gas in the gas-conveying part of the measuring instrument is increased or decreased as a function of the gas pressure that is to be measured, thereby retaining a mobility of the membrane and, therefore, the relaying of changes in pressure.

The change in the amount of gas is effected by means of pumping devices in the form of a peristaltic pump actuated via a control system. The compressibility of the volume of gas to be interposed according to the EP application has the effect of forming a kind of acoustic low-pass filter, which damps or suppresses rapid changes in pressure or relatively high-frequency pressure oscillations. The system according to said document is suitable in practice only for measuring static pressures or for monitoring mean values, it being possible to set the formation of the mean pressure value by the damping characteristics of the system, for example via the volume of gas switched between membrane and pressure transducer. For arrangements of such a type, an upper cut-off frequency of approximately 0.1 Hz is known from prior use for recording changes in pressure.

DE 29 30 869 C2 describes a pressure-measuring capsule for securing on a measuring transducer, which capsule has a housing in which, within an annular bead, a hollow space is formed which is closed by a membrane adhesively affixed to the annular bead. It is intended that the hollow space can be filled with a liquid or a gas via two connection tubes.

The main subject matter of the description is the formation of continuations of a cylindrical housing body of the pressure-measuring capsule in order to form a bayonet connection with correspondingly formed mating pieces on a measuring transducer. Emphasis is placed in particular on an elastic design of the continuations in order to form defined snap-in end positions of the partners in the bayonet connection, the pressure transducer and pressure-measuring capsule having to be turned in relation to each other in order to establish the mechanical connection. The resilient design of the parts of the bayonet connection on the side of the pressure-measuring capsule is intended to ensure that production tolerances can be compensated and a snap-in end position of the pressure-measuring capsule in relation to the pressure transducer can be achieved.

The snap-in position is at the same time intended to have the effect of exerting a defined prestressing force on the pressure transducers, the inventors envisioning that said position is to be consistently reproducible with different pressure transducers, in such a way that zero balancing of the evaluation electronics used is no longer required.

The cited document describes a bayonet connection as particularly advantageous, the known disadvantages thereof being in particular a rubbing relative movement between the bayonet connection partners that are to be connected.

European Patent EP 0 330 891 B1 describes an arrangement for transmitting the pressure of a fluid to another fluid. For this purpose, an elongate housing is proposed whose inner space, in the form of an ellipsoid of revolution, is divided into two spaces by a flexible membrane, it being possible for these two spaces to be arranged in such a way that they each form adjoining areas of the inner space, or else concentrically. One of the spaces is intended to be provided with an inlet opening and an outlet opening, in order to allow a first fluid, for example blood, to flow through it.

The second space is provided with a single opening, via which a fluid that can be introduced into the second space is to be connected to an external pressure-measuring device, for example, in order to measure the pressure of the blood flowing through the first space.

It is described and claimed as being essential to the invention that the membrane is introduced into the housing in an unstretched or even folded state, the inventors concerned hoping that this will improve the pressure-measuring capabilities and in particular the measurement also of negative pressures, without further details of this being specified.

WO 97/39679 describes coupling a kind of pressure dome to a transducer, although the measurement chamber of the "pressure dome" is not closed off from the environment by a membrane but by an isolating gel. When pressure dome and transducer are being assembled, the flowability of the gel is intended to allow air to be pressed out between pressure dome and transducer through venting channels.

U.S. Pat. No. 4,562,845 describes a screw connection that leads to a sealed coupling of a pressure dome to a transducer. Since the device described there is intended to be part of the system likewise described there for monitoring other transducers for a malfunction and for detecting air bubbles in blood-pressure monitoring systems, the pressure dome described there does not have a membrane for the sterile sealing of the fluid system from the environment and from the transducer.

U.S. Pat. No. 4,462,409 discloses a pressure dome which, however, is not intended for looping into an extracorporeal circulation or for an infusion solution to flow through, but as a termination of a tap line which can be hydraulically coupled via an infusion system to the circulation of a patient for pressure transmission. The measurement chamber of this pressure dome is separated from a transducer by a membrane. The transducer comprises a two-part housing, of which a first housing part (53 there) has a connecting surface on which the membrane of the pressure dome bears. Provided on this connecting surface of the housing part is a rib (63*a*), which is intended to ensure a firm fit of a bead of the membrane in a groove in the housing and, therefore, a reliable sealing of the measurement chamber.

However, the pressure dome is firmly connected to the housing part of the transducer by welding (loc. cit., column 4, lines 60-67), such that an arrangement with a disposable dome and a reusable transducer is not possible.

U.S. Pat. No. 4,920,972 describes a system consisting of a disposable dome and of a reusable transducer, in which the measuring chamber in the dome and also the transducer are each closed off by a membrane. Moreover, the teaching of said document concerns the oil for pressure transmission within the transducer being replaced by a gel which, after being introduced in liquid form into the transducer housing, sets to the desired gel form only when the transducer has been heated to 65° C. for four hours. This arrangement is intended to increase the upper cut-off frequency of a transducer.

U.S. Pat. No. 5,551,300 discloses a set consisting of a disposable pressure dome and of a reusable transducer, in which both the measuring chamber of the pressure dome and also a liquid-filled measuring space of the transducer are closed off by a flat membrane adhesively affixed to the respective housings. It is intended, in respect of the transducer, for a pressure equalization of the liquid-filled measuring space of the transducer to be carried out in such a way that the measuring space is in flow connection with an equalization vessel, which is closed off from the environment by an elastic membrane.

The liquid system is in this case intended to be filled with a slight overpressure, in order to ensure a contact of the two pressure-transmitting membranes and, therefore, the operational capability of the system. To prevent a pressure equalization in the liquid system of the transducer during the measurement, as is a prerequisite for pressure measurement, it is proposed to allow the transducer membrane to protrude slightly and to provide a connection of the liquid-filled measuring chamber of the transducer to the pressure-equalizing vessel via a hole on the front of the transducer, which is likewise covered by the transducer membrane. By connection to the pressure dome, the membrane is mechanically applied to the housing of the transducer and, as a result, the equalizing opening is closed, such that only the liquid remaining in the measuring chamber of the transducer can damp a signal transmission to a piezo sensor.

DE 44 19 593 A1 discloses a device for measuring the pressure of a medium, in particular for pressure measurement in extracorporeal blood circulations, for example a dialysis system, in which a disposable element is provided that contains a measuring chamber and has two hose connections, it being intended for the measuring chamber to be closed by a membrane which is to be placed in a circumferential groove and which is to be secured there by means of a metallic clamping ring or by adhesive bonding. It is emphasized as being particularly expedient that a circumferential bead is formed around the part of the measuring chamber that is in connection with the membrane, in particular by an O-ring, which lifts the membrane in the area of the connection to the measuring chamber above the surface of the element. This is intended to allow a good coupling of the membrane to a pressure-measuring transducer when the element is placed in a drawer of the measuring system and the pressure transducer is moved toward the element, preferably pneumatically or by a spindle.

Furthermore, the device according to DE 44 19 593 A1 requires considerable effort for fitting the measuring element, in particular with regard to fitting the membrane, which additionally requires great effort for checking how well it has been fitted for reasons of product liability. Furthermore, the large number of parts and, in particular, the hollow spaces formed between membrane and O-ring can also lead to problems in sterilization. With regard to the effort required for fitting and quality assurance, this leads to such high costs that a measuring system of this kind is not acceptable for disposable use.

Furthermore, the corresponding arrangement of the pressure-measuring sensor requires great expenditure on apparatus, in particular with regard to the moving device for the sensor and the calibration of the sensor, dependent on the path of movement, with the result that such a system is unsuitable for everyday clinical use on account of the handling effort and the enormous costs.

DT 21 29 670 A discloses what is known as a vacuum capsule, in which an elastic membrane is arranged in a fixed metal capsule, where aspects described as being essential to the invention include the design of the membrane and the securing on a push rod, such that the membrane bears on one side of the capsule during production and, after prestressing by a spring as a function of the absolute air pressure to which the membrane is subjected on one side, can perform adjusting work via the push rod and thereby travel over a considerable stroke, in particular as a function of the prestressing by the spring. However, this device is not intended to allow through-flow and, on account of its design and intended purpose, is entirely unsuitable for measuring pressures, particularly in extracorporeal circulations.

DE 93 17 751 U1 discloses a pressure-indicating device which, on reaching a certain predetermined pressure value, indicates a color change from green to red, or vice versa, visible through a transparent disk, and/or can actuate an electrical switch or button via a push rod. For this purpose, a liquid is enclosed in the gap between a membrane and a measuring housing. If the pressure on the other side of the membrane, which corresponds to the evaporation point of the liquid, falls below a limit pressure, the liquid evaporates and the membrane performs an abrupt stroke together with a push rod secured to it, such that a warning button or the like can be actuated by the push rod. Suitable coloring of the liquid obscures the view through to a disk of a signaling color on the membrane, which suddenly becomes visible upon evaporation of the liquid and is thus intended to produce a signaling effect.

It is quite evident that this device is unsuitable for the continuous measurement of pressures.

Finally, WO 99/37983 discloses a pressure dome which is designed and suitable in particular for use in extracorporeal blood circulations, for example in hemodialysis, and which furthermore can be handled particularly well as a result of a releasable snap connection for securing on a transducer.

DE 198 02 615 A1 and WO 99/37983 disclose a pressure dome in which the measuring chamber, at the height of mutually opposite parts of the wall that form an edge of the measuring chamber in the part of the wall lying opposite the membrane and forming a cover of the measuring chamber, has in each case an inlet opening and an outlet opening, and the cover is drawn in in a central area of the measuring chamber, thus resulting in an annular channel-shaped part of the measuring chamber with a greater distance between membrane and cover and a central area of the measuring chamber with a smaller distance between cover and membrane, and the wall of the measuring chamber, except for the inlet and outlet openings and the transition from the membrane to the remainder of the wall, is designed free of edges (rounded).

In the area of the membrane, a device is provided for mechanically coupling the connecting element to the measurement recorder, which device is part of a releasable spreading-in connection formed by claw-shaped retaining elements in the form of hooks for engagement in a corresponding groove or undercut of the measurement recorder or of an associated securing means.

DE 100 32 616 A1, WO 2002/003854 A1, U.S. Pat. No. 6,880,404 B2 and DE 201 22 806 U1 disclose a pressure dome in which the membrane has a circumferential bead located on that side of the membrane facing the measuring chamber, said bead engaging in a groove which is formed in a housing and which extends about the measuring chamber, and the wall (inner wall) of the groove facing the measuring chamber has a shorter height than the wall (outer wall) of the groove facing away from the measuring chamber. Particularly in conjunction with an adapted measurement recorder, the described embodiment is intended to avoid an inclusion of air between the membranes when the pressure dome is mounted on the transducer and is thereby intended to achieve improved measuring properties in respect of the measurement of negative pressures and in respect of the dynamic transmission behavior of the overall arrangement.

A disposable pressure dome under the name MX848X2SC, with a three-way cock and with a nonreturn valve, is known from public prior use by the Smiths Medical, London, GB. In the known pressure dome, the membrane is likewise provided with a circumferential bead which is inserted in a groove surrounding the outside of the measuring chamber. The groove, with the part of the membrane located therein, is partially covered on the outside by an annular disk, which is welded or adhesively affixed to the housing body of the pressure dome.

It has been found in tests that the membrane of such a pressure dome, when subjected to pressures greater than is customary when monitoring the blood pressure of human patients, i.e. positive pressures considerably above 260 mmHg, bulges forward without mechanical support from the secured transducer such that, by virtue of the great elasticity of the material, the bead holding the membrane is withdrawn from the groove, without this being able to be prevented by the annular disk. However, it is not acceptable for the membrane to slip out, since this cancels the sealing of the fluid system, which leads to contamination of the environment, but also to contamination of the fluid, and which in many areas must be avoided under all circumstances.

Consequently, system elements of the type mentioned at the outset have hitherto been considered unsuitable for use at high pressures, particularly outwith the field of monitoring of vital functions in medicine.

SUMMARY

The object of the invention is therefore to make available inexpensive disposable system elements for pressure monitoring that are also usable in other areas outwith the monitoring of vital functions in medicine.

This object is achieved, according to the invention, by a system element of the type mentioned at the outset in which the bead engages in a recess that is formed in the housing around the outer wall and that extends around the measuring chamber, and protruding pins are arranged in the area of the recess around the outer wall, and holes are provided in the bead of the membrane, such that the pins engage in the holes in the bead of the membrane.

The inventor has discovered that, by virtue of the design according to the invention, the membrane does not deform so much as in the known system elements when it is exposed to high pressures, and, in particular, it is practically impossible now for the membrane to slip from the housing. Therefore, for the established system elements that are to be produced inexpensively and that are to be discarded in an environmentally friendly manner as disposable articles, a further field of use is also opened up in the industrial sector where importance is attached to a hygienically sealed closure of the fluid system, for example in the field of biotechnology.

It is particularly expedient if the pins are distributed uniformly around the outer wall. The number of pins is advantageously at least three, preferably four to twelve, particularly preferably six to ten. In an embodiment that was tested successfully in trials, eight pins are provided.

In order to avoid a risk of the membrane tearing on account of the notch effect and cross-sectional weakening of the bead, it is expedient if the pins have a greater length than width in the circumferential direction around the outer wall, in particular having a curved oval shape.

It has proven advantageous if the length of the pins is approximately ⅔ of the distance between two pins.

For a high degree of resistance to removal of the membrane, it has proven advantageous if the pins protrude approximately coaxially with respect to the outer wall, and if the height of the pins is at least half the height of the recess relative to the edge of the outer wall, particularly if the height of the pins is approximately ⅔ of the height of the recess relative to the edge of the outer wall.

An embodiment of the invention has proven particularly advantageous in which a retaining ring is also provided, which engages around the edge of the outer wall of the measuring chamber and which is fixed relative to the housing, particularly if the retaining ring covers at least the gaps between the pins. It has been found in tests that the overpressure at which the system element is leaktight without the support of a measurement recorder is limited only by the bursting pressure of the membrane, and no longer by the securing of the membrane on the housing.

The arrangement is particularly stable if the retaining ring also at least partially covers the bead of the membrane on the radially outer side thereof. This also protects the outer face of the bead from mechanical damage that can impair the strength of the bead, as can occur, for example, if the system element is placed clumsily onto the measurement recorder. For this purpose, the retaining ring expediently comprises a radial wall section and an axial wall section.

A system element according to the invention is particularly safe if the retaining ring is connected to the housing in such a way that the retaining ring cannot be withdrawn from the housing in the axial direction without being destroyed. For this purpose, it is expedient if the retaining ring is connected cohesively to the housing, for example by suitable welding techniques. For this purpose, it is particularly expedient if the retaining ring is made of the same material as the housing.

However, for production reasons, it is particularly advantageous if the retaining ring is connected to the housing by a spreading-in connection (snap-fit connection). In this way, it is possible to avoid the negative effects of welding to the membrane, depending on the membrane material.

In order to allow a system element according to the invention to be easily and quickly placed onto or removed from the measurement recorder (transducer), it is expedient if preferably two resilient continuations of the housing are also provided on the housing, for the purpose of mechanically coupling the connecting element to the measurement recorder (transducer), and are part of a releasable spreading-in connection that is formed by claw-shaped retaining elements in the form of hooks which are provided on the continuations for engagement in a corresponding groove or undercut of the measurement recorder or of an associated securing means, wherein the system element further comprises a securing ring which has a non-circular configuration, with a first operating position, in which the retaining elements are radially movable about the measuring chamber, such that the system element can be placed onto the measurement recorder or can be removed therefrom, and a second operating position, in which the retaining elements are fixed in a position such that system element and measurement recorder cannot be separated without damage.

By using the securing ring, it is possible to practically eliminate the risk whereby, particularly in the event of high pressure peaks or pressure fluctuations, especially when the intended maximum system pressure is exceeded on account of operating disturbances, the engagement of the hooks in the groove or undercut of the measurement recorder or of an associated securing means can come loose and, with the loss of the support by the measurement recorder as abutment, the membrane becomes overloaded and bursts, thus allowing fluid to escape from the system. In any case, however, it is ensured that ongoing measurement or monitoring is not interrupted by the system element slipping off.

For transport and handling before placement on a measurement recorder, it is particularly expedient if the securing ring, on its side facing away from the housing, has a protective plate that is connected via predetermined break points to the body of the securing ring and that covers the membrane. The protective plate can be easily broken out and removed by the user, but until then it protects the membrane from any mechanical damage that could reduce the pressure resistance of the system element.

For the application in the use of bioreactors and filtration systems, it is particularly advantageous if the membrane is secured on the housing in such a way that it does not come loose from the housing at an overpressure of at least 6,000 hPa in the measuring chamber relative to the environment, without being connected to a measurement recorder.

FIGURES

The invention will be explained in more detail on the basis of non-limiting illustrative embodiments depicted in the drawings, in which.

DETAILED DESCRIPTION

The figures depict various embodiments of a system element according to the invention for the releasable sealed connection of a measurement recorder (not shown) to a fluid system in the form of what is called a pressure dome. The transducers already in use in the field of medical technology, and already known from the above-described prior art, are possible examples of the measurement recorder.

Figure 1:
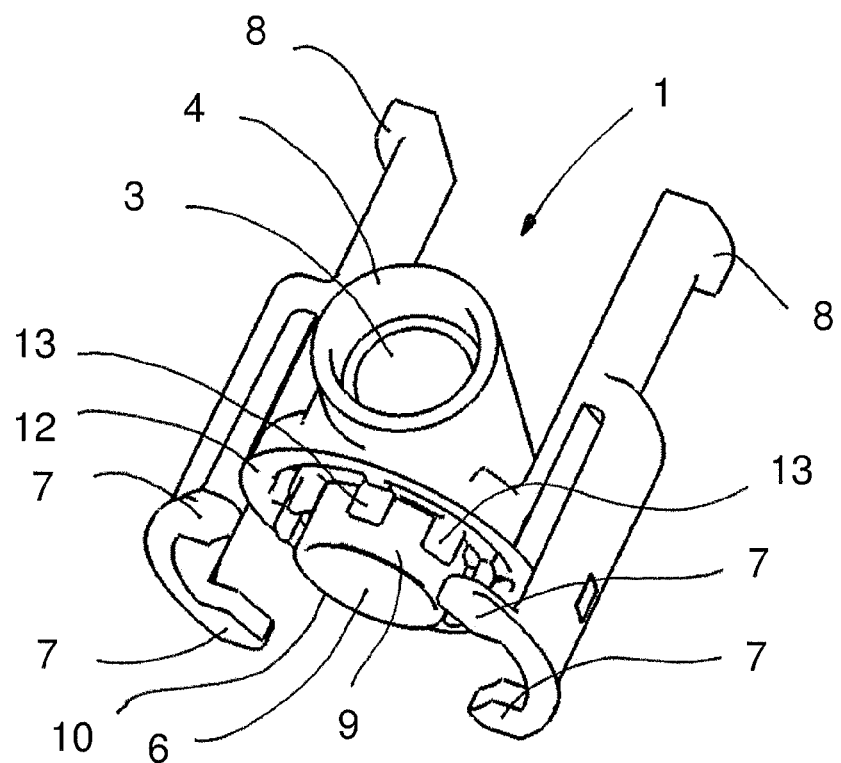
FIG. 1 shows a perspective view of a housing of a first embodiment of a system element according to the invention, seen obliquely from below.
Figure 2:
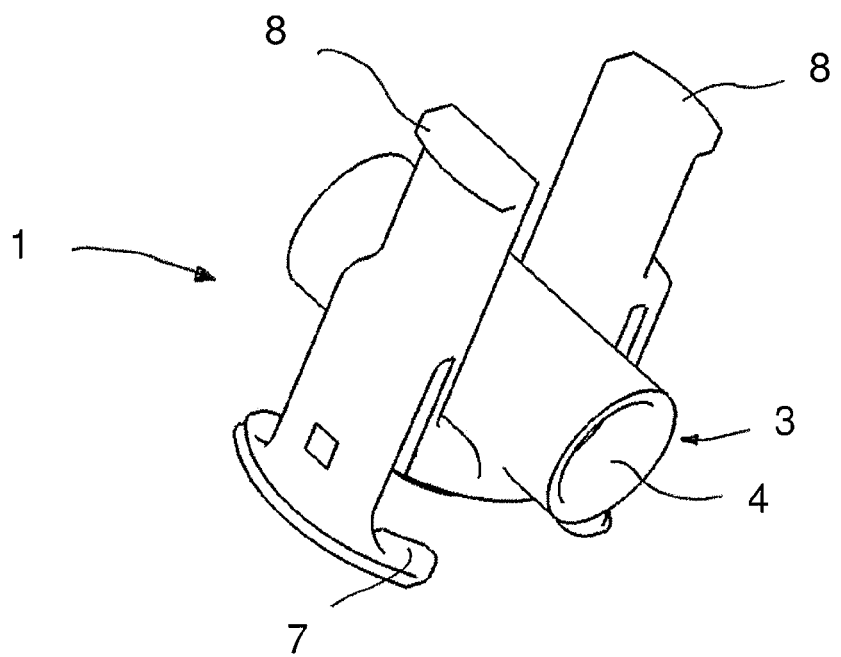
FIG. 2 shows a perspective view of the housing of a system element according to the invention from FIG. 1, seen obliquely from above.
Figure 13:
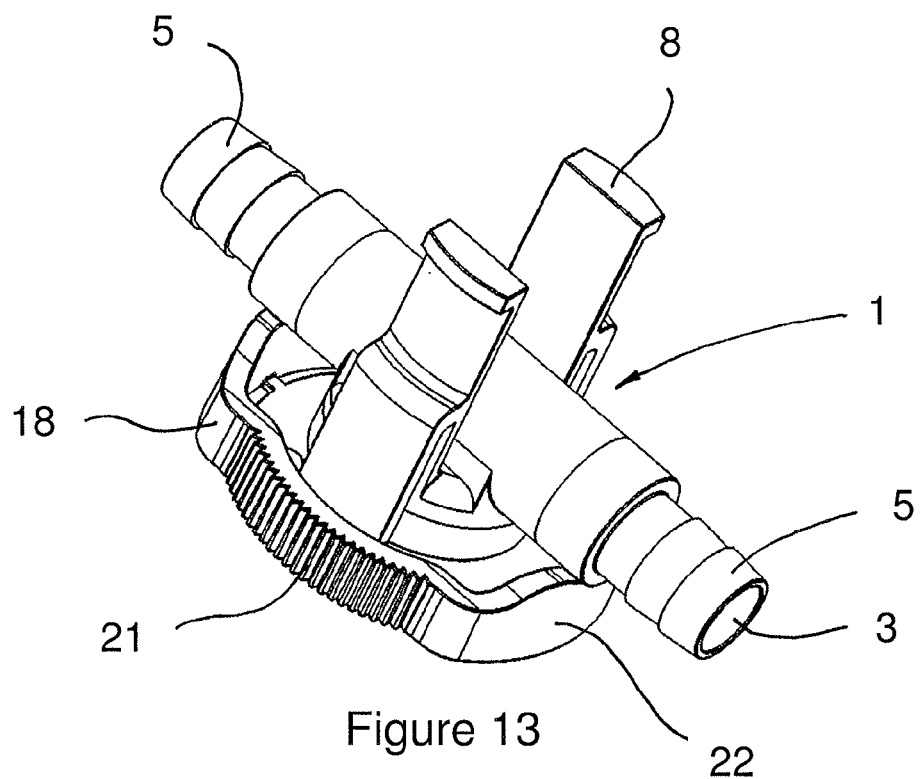
FIG. 13 shows a perspective view of another embodiment of a system element according to the invention, with securing ring and protective plate, seen obliquely from above.
Figure 14:
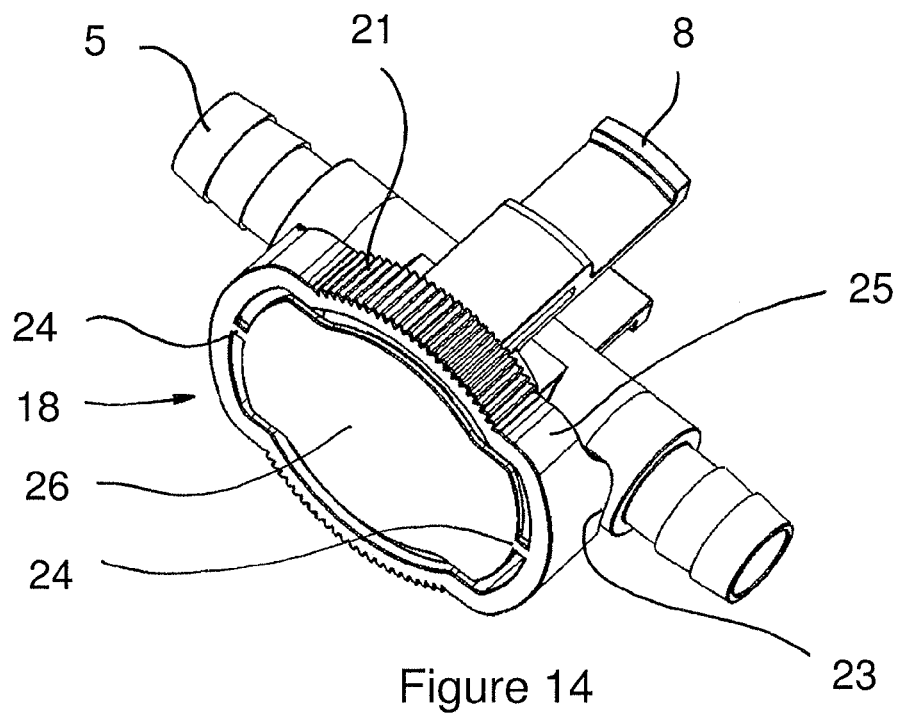
FIG. 14 shows a perspective view of the system element with securing ring and protective plate from FIG. 13, seen obliquely from below.

In a first embodiment of the invention, a system element or pressure dome according to the invention consists of a housing 1 and of a membrane 2. An embodiment of a housing 1 is shown in FIGS. 1, 2 and subsequent figures, and another embodiment is shown in FIGS. 13 and 14. The housing 1 has openings 3 as inlet and outlet for connection to a fluid system, for example an infusion appliance, and to a patient, for example via a cemented-in three-way cock, or for looping into an extracorporeal blood circulation, for example a dialysis apparatus, a heart-lung machine or a cell separator, or also to another fluid system such as a filtration system or a bioreactor.

Figure 5:
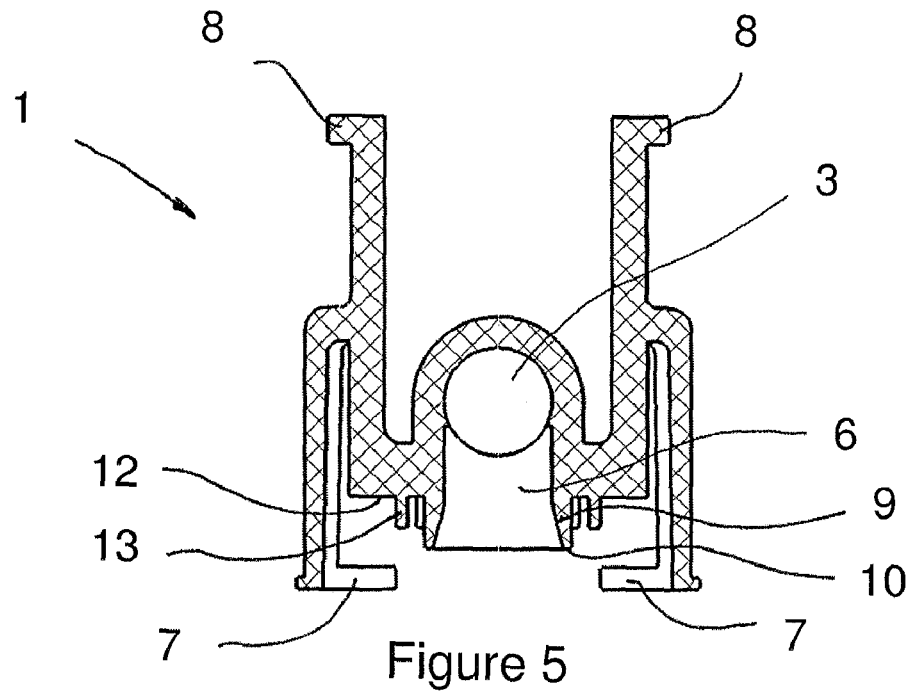
FIG. 5 shows a sectional view of the housing from FIGS. 1 and 2.

The inlet and outlet have corresponding connectors, for example in the form of a conical packing seat 4, as can be seen in FIG. 5 for example, a cementing-in groove or some other sealed connection system customary in medical technology or biotechnology. The dimensioning of the connectors 4 can conform to DIN 13090, for example. The connectors 4 can comprise, for example, lockable Luer lock connections with a loose threaded part or with an external full thread, as are indicated in DIN 13 090 Part 2, for example, or also hose fittings 5 (also called hose stubs), as are shown in FIGS. 13 and 14, for example.

Suitable diameters of the inlet and outlet openings 3 are in the range of over 1 mm for measurement with static liquid columns, and of up to 10 mm for use in an extracorporeal blood circulation. To connect the fluid system to customary transducers used as measurement recorders in medical technology, the diameter can also be up to one inch, corresponding to over 25 mm.

In the housing 1, a measuring chamber 6 is formed which is in fluid communication with the inlet and outlet openings 3. The housing 1 is produced particularly economically as a one-piece injection-molded component, preferably from a sterilizable material, for example a polycarbonate. A part of the wall of the measuring chamber 6 is formed by the elastic membrane 2 (shown in FIGS. 3 and 4), for example made from an EPDM, a TPE, preferably from a TPE of the class SEBS, or from some other suitable sterilizable material that is resistant to the fluid in the fluid system and, if appropriate, is physiologically harmless. Gamma irradiation can also be used as the sterilization method.

Figure 6:
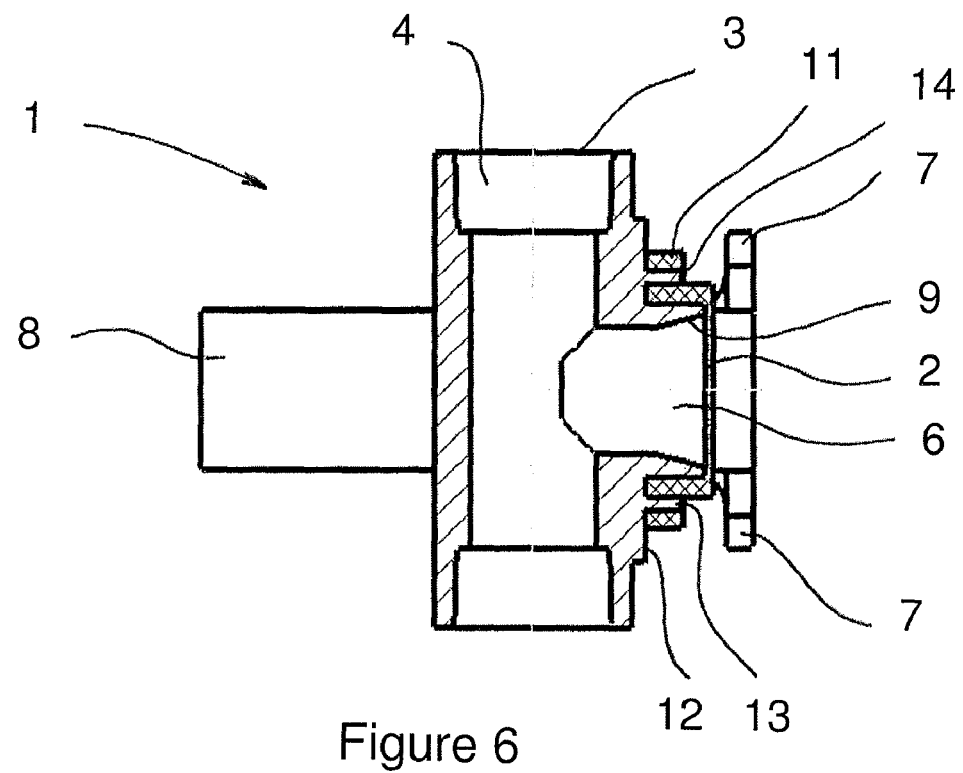
FIG. 6 shows a sectional view of a system element according to the invention with a housing according to FIG. 5 and with a fitted membrane.

Thus, in a first embodiment, the system element preferably consists solely of the membrane 2 and of a one-piece plastic injection-molded component as housing 1, as is shown in FIG. 6. In order to permit efficient pressure transmission to customary transducers, the material of the membrane, and the processing thereof during production, for example injection molding, should create a membrane which seals an underpressure of 530 hPa with respect to air when a contact pressure of 60 N is applied to a finely turned steel surface.

A device is also provided for mechanically coupling the connecting element to the measurement recorder (transducer) and forms part of a releasable spreading-in connection, which is formed by claw-shaped retaining elements in the form of hooks 7 for engagement in a corresponding groove or undercut of the measurement recorder or of an associated securing means.

The hooks 7 are formed by resilient continuations of the housing 1, and each pair of hooks is integrally connected in one piece to a respective grip 8. In this case, four uniformly distributed hooks 7 are provided in total. In this way, by pressing the grips 8 together, it is possible for the system element to be assembled and disassembled unseen and using one hand.

For measuring pressures below atmospheric pressure also, it is expedient if the resilient connection of the hooks 7 to the housing 1 is such that a pre-stressing force of at least approximately 60 N can be maintained.

However, instead of hooks 7 and a corresponding undercut on the transducer (not shown), other known coupling mechanisms can also be used, although a rotation movement between membrane 2 and transducer membrane should be avoided. For this purpose, for example, hooks and undercut can be interchanged. Another snap-fit connection can also be provided, for example as is proposed in WO 99/37983 or U.S. Pat. No. 6,880,404 B2. Moreover, bayonet connections, preferably with a screw collar ring, can also be used, also suitably as a screwed connection, if excessive tightening of the connection is avoided by suitable spacers or the like. Finally, it is also possible to provide pivotably mounted clamps or toggle catches in the manner of closure hooks.

The part of the wall of the measuring chamber 6 adjacent to the membrane 2 forms an outer wall 9 with an edge 10 on which the membrane 2 bears. The membrane 2 has a circumferential bead 11, which is located on that side of the membrane 2 facing the measuring chamber 6. The bead 11 engages in a recess 12 that is formed around the outer wall 9 in the housing 1 and that extends around the measuring chamber 6, as can be seen in particular in FIGS. 1 and 5. Protruding pins 13 are arranged around the outer wall 9 in the area of the recess 12. The bead 11 of the membrane 2 is provided with corresponding holes 14, either in the form of through-holes, as can be seen in particular in FIG. 4, or in the form of blind holes (not shown), such that the pins 13 engage in the holes 14 in the bead 11 of the membrane 2, thus providing increased safety against the membrane being removed by the internal pressure in the measuring chamber 6. A system element according to the invention with housing 1 and fitted membrane 2 can be seen clearly in the sectional view in FIG. 6.

Figure 3:
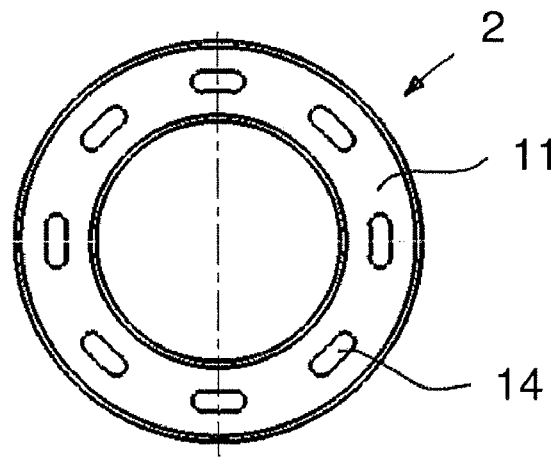
FIG. 3 shows a plan view of a membrane of a system element according to the invention.
Figure 4:
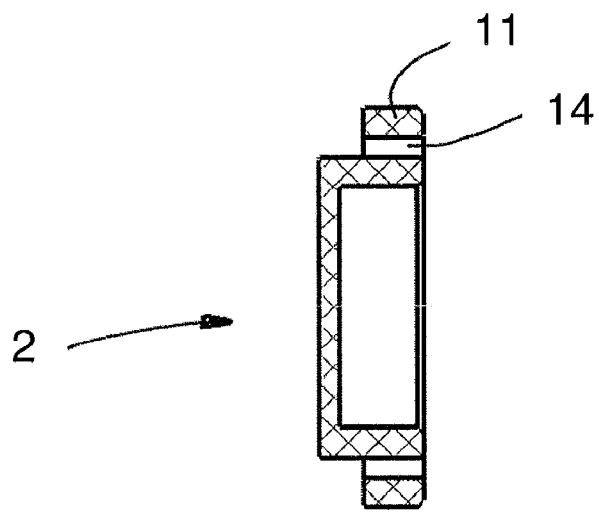
FIG. 4 shows a sectional view of the membrane from FIG. 3.

An expedient distribution, shape and size of the holes 14 in the membrane 2 can be seen from the plan view in FIG. 3. Here, eight holes 14 are shown, and FIGS. 1 and 7 correspondingly show eight pins 13, which are distributed uniformly around the outer wall 9. The number of pins 13 (and correspondingly of holes 14) should be at least three, but better protection against removal is afforded by four to twelve, preferably six to ten pins 13. A greater number of pins 13, at a size adapted to the aforementioned customary transducers, would lead to very small pins and holes and, as a result, the desired greater mechanical load-bearing capacity of the connection of membrane 2 and housing 1 would no longer be able to be achieved. A greater number of pins 13 and holes 14 may, however, be advantageous in larger system elements.

In order to achieve a good holding effect between membrane 2 and pins 13, with the least possible material weakness caused by the notch effect of the holes 14 in the membrane 2, the pins 13 and the holes have a greater length than width in the circumferential direction around the outer wall and are curved around the measuring chamber 6. It has proven practical if the length of the pins 13 is approximately two thirds of the distance between two pins 13.

The pins 13 protrude approximately coaxially with respect to the outer wall 9. Since the bead 11 of the membrane 2 is expediently set back relative to the contact plane with a measurement recorder, in order to obtain an as far as possible uninfluenced membrane-membrane coupling, it is advantageous if the height of the pins 13 is approximately ⅔ of the height of the recess 12 relative to the edge 10 of the outer wall 9, as can be seen clearly in FIG. 6.

Figure 7:
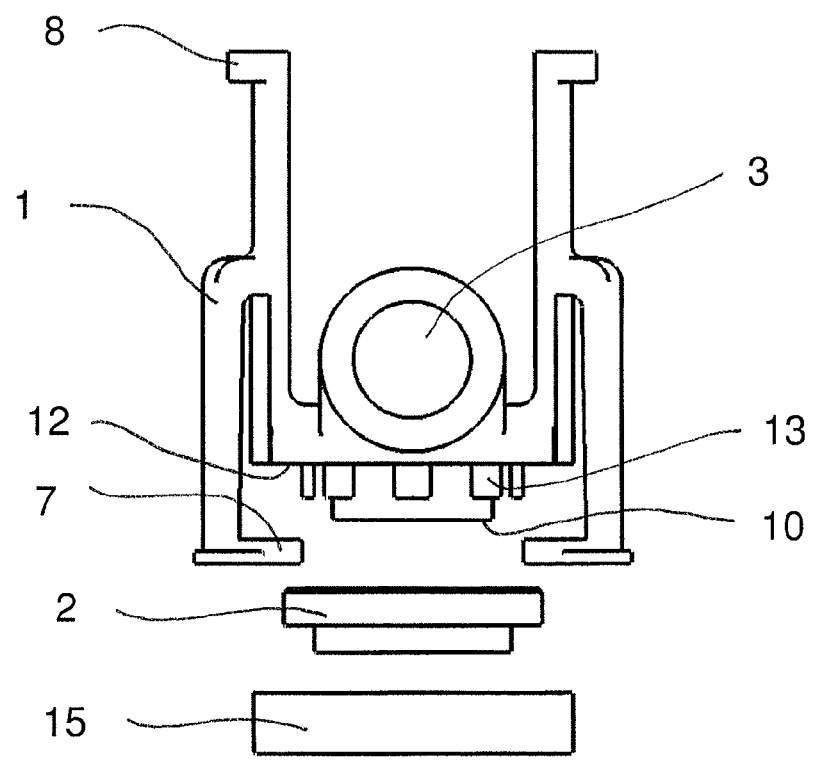
FIG. 7 shows an exploded view of another embodiment of a system element according to the invention, with additional retaining ring.
Figure 8:
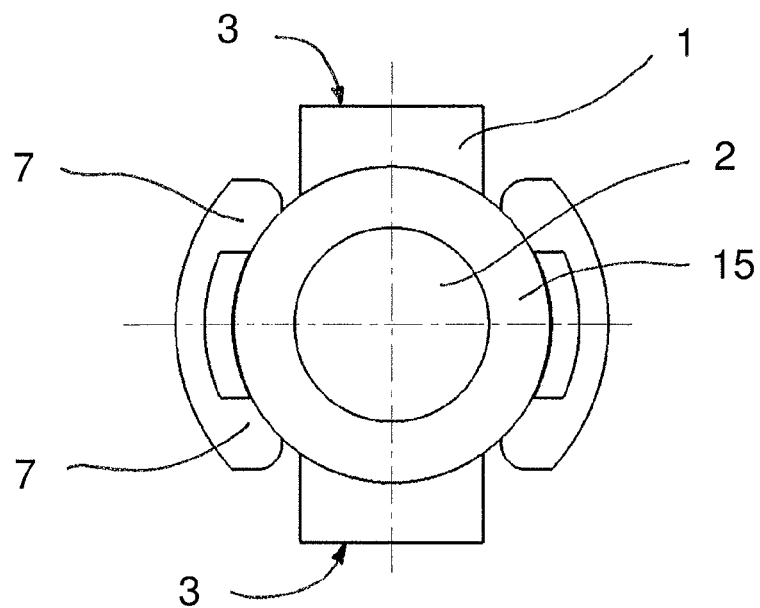
FIG. 8 shows a bottom view of the embodiment of a system element according to the invention with additional retaining ring from FIG. 7.
Figure 9:
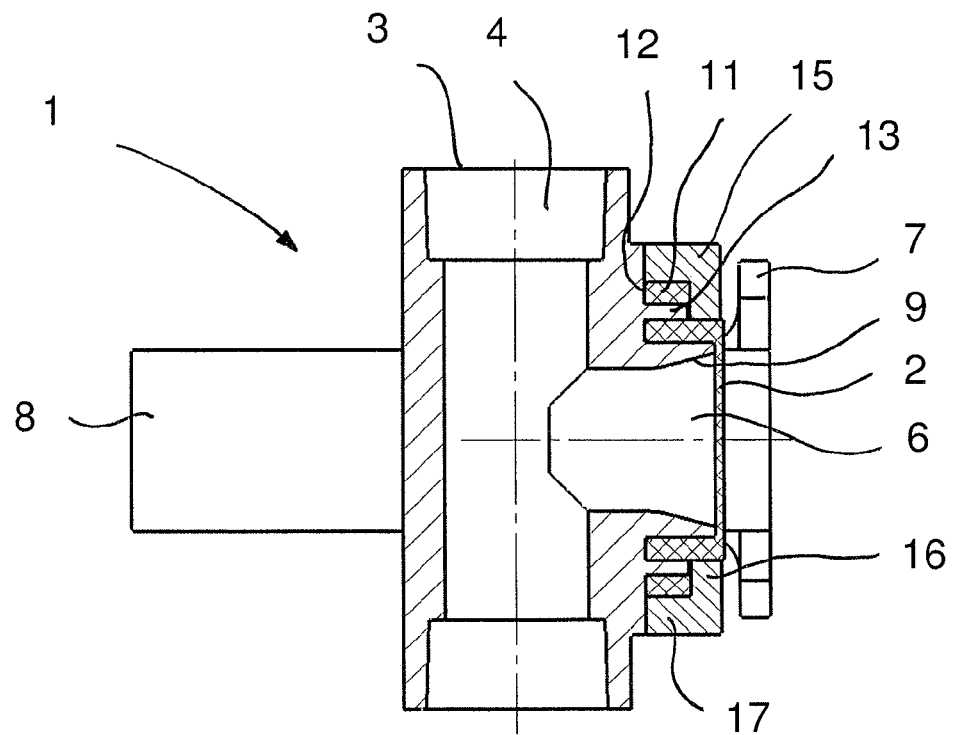
FIG. 9 shows a sectional view of the system element with additional retaining ring from FIGS. 7 and 8.
Figure 10:
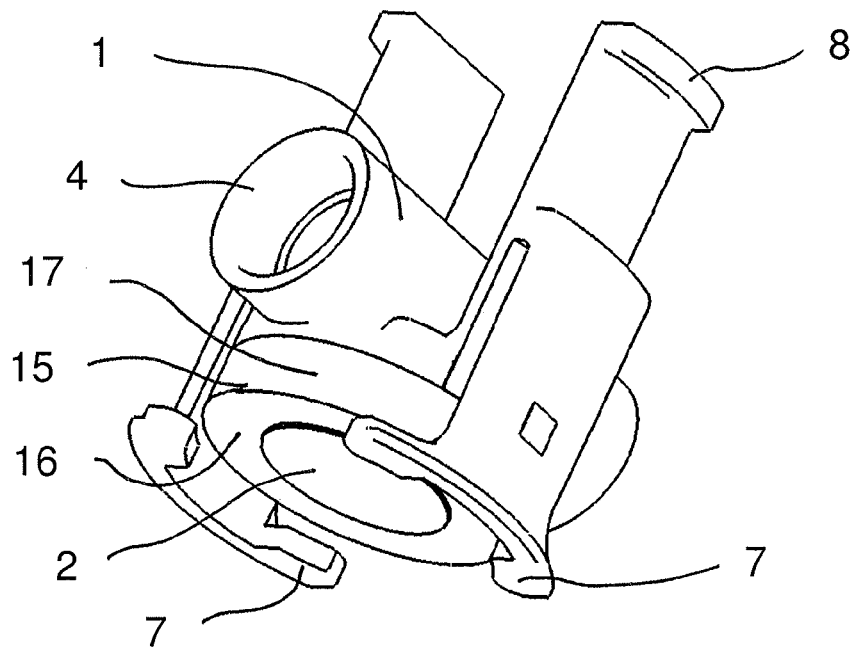
FIG. 10 shows a perspective view of the system element with additional retaining ring from FIGS. 7 to 9, seen obliquely from below.

FIG. 7 shows an exploded view of another embodiment of a system element according to the invention, with an additional retaining ring 15. FIG. 9 shows a sectional view of this embodiment of the invention, with membrane 2 and retaining ring 15 being mounted on the housing 1 in this view. FIG. 8 shows a bottom view, and FIG. 10 shows a perspective view obliquely from below. As can be seen clearly in FIGS. 8 and 9, the retaining ring 15 engages around the edge 10 of the outer wall 9 of the measuring chamber 6 and, with its radial wall section 16, covers the bead 11 of the membrane 2 in the area of the pins 13, shown here and preferably about the whole circumference. For a better fit of the membrane 2, a covering is required at least in the area of the gaps between the pins 13. With its axial wall section 17, the retaining ring 15 covers the bead on the radial outer side thereof. In this way, a mechanical protection for the bead 11 can be achieved, and the retaining ring 15 can be connected effectively to the housing 1, preferably cohesively by welding, such that the retaining ring 15 cannot be removed from the housing 1 in the axial direction without being destroyed. For this purpose, it is expedient if the retaining ring 15 is made of the same material as the housing 1.

This embodiment practically rules out the possibility of the membrane 2 deforming, on account of a pressure load from the direction of the measuring chamber 6, and slipping from the housing 1. Instead, tests have shown that, before this, the membrane 2 will tear in the area of the measuring chamber 6.

Instead of being welded, the retaining ring 15 can also be connected to the housing 1 by a spreading-in connection.

Figure 11:
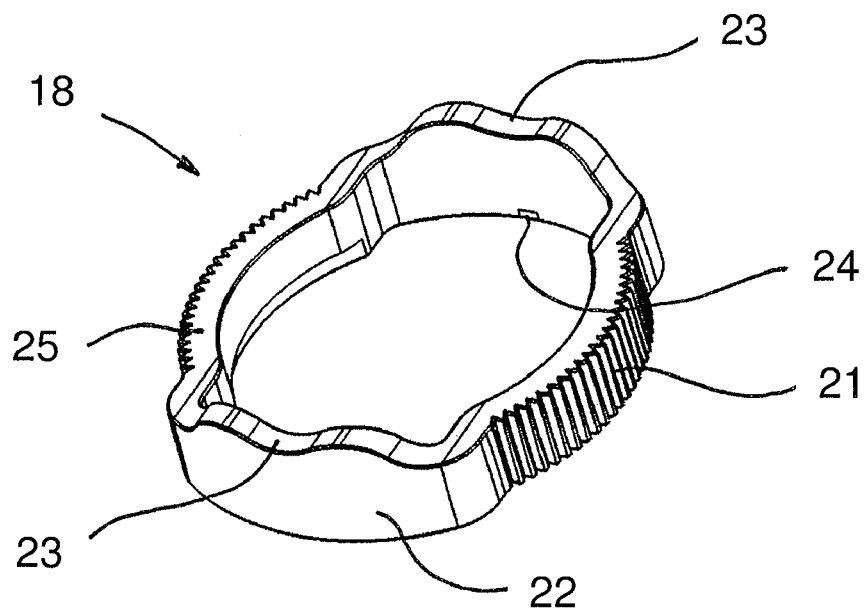
FIG. 11 shows a perspective view of a securing ring of a system element according to the invention, seen obliquely from above with the protective plate broken away.

In the embodiment of a system element according to the invention shown in FIGS. 13 and 14, a securing ring 18 as shown in FIG. 11 is also provided. The securing ring 18 has a non-circular configuration, but it has two circle sections 21 that lie on a first axis 19 and, for example, are ribbed on the outer surface in order to provide improved handling. In a second axis 20 at right angles to the first axis 19, a section 22 is arranged in which the securing ring is widened approximately rectangularly. In this area, locking depressions 23 are provided on the upper face of the securing ring 18.

In a first operating position (not shown) of the securing ring 18, the resilient continuations of the housing 1, with the hooks 7 facing radially outward relative to the measuring chamber 6, are movable in the widened section 22 of the securing ring 18, such that, by pressing the grips 8 together, the hooks 7 can be moved in order to be able to place the system element onto a transducer or remove it.

The securing ring 18 can be turned to a second operating position, as is shown in FIGS. 13 and 14. In this position, the retaining elements with the hooks 7 are fixed in a position such that system element and measurement recorder cannot be separated from each other without damage. In this position of the securing ring 18, however, it is also not possible for the system element to be placed onto a transducer by pressing the grips 8 together and thus spreading the hooks 7 apart. In this operating position, the securing ring 18 is secured against inadvertent turning by means of the locking depressions 23 engaging with the housing part that forms the inlet and outlet openings 3. This position is also advantageous during transport and storage of a system element according to the invention.

Figure 12:
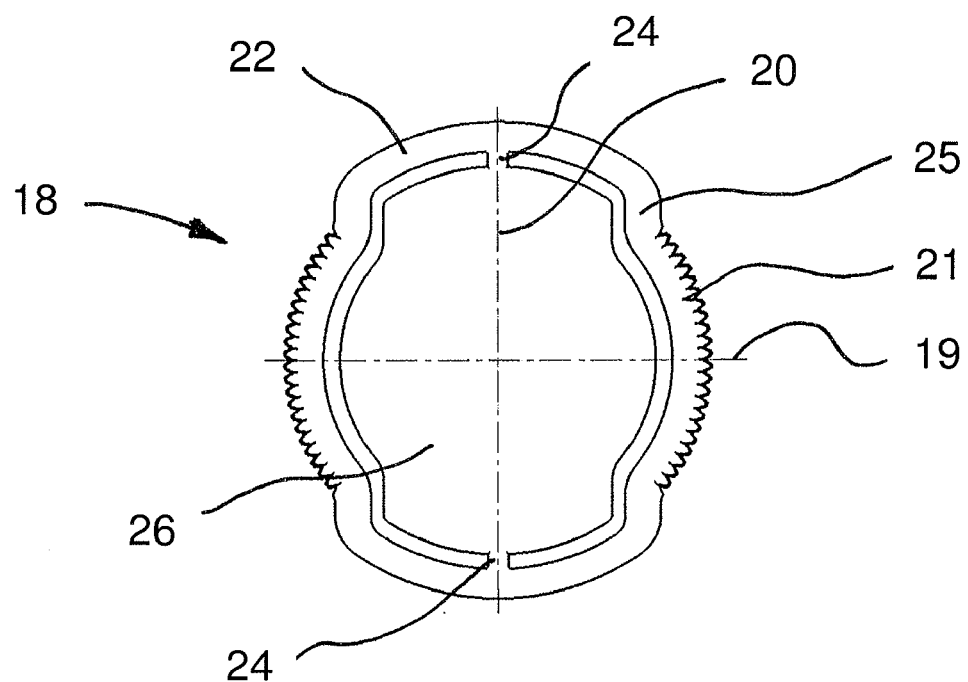
FIG. 12 shows a bottom view of a securing ring from FIG. 11, with protective plate.

To protect the membrane during transport and storage with a securing ring fitted, it is particularly advantageous if the securing ring 18, on its side facing away from the housing 1, has a protective plate 26 connected via predetermined break points 24 to the body 25 of the securing ring 18, as is shown in FIG. 12. This protective plate 26 covers the membrane 2 when the securing ring 18 is placed onto the housing 1 of the system element, as is shown in FIGS. 13 and 14. The protective plate 26 can be easily broken out and removed by the user when the system element is to be placed onto a transducer.

Tests have shown that the improvement, according to the invention, of known system elements has the effect that, even in the absence of an abutment provided by the membrane of a transducer, the membrane 2 does not come loose from the housing 1 at an overpressure of at least 6,000 hPa in the measuring chamber 6 relative to the environment, and, as a result, well-established and inexpensive disposable pressure domes having the improvement according to the invention will in future also be able to be used for industrial applications.

What is claimed is:

1. A system element for the releasable sealed connection of a measurement recorder to a fluid system, with a measuring chamber that can be connected to the fluid system in such a way as to allow through-flow, wherein the measuring chamber is formed in a housing, and a part of the wall of the measuring chamber is formed by a membrane that is substantially more flexible than the remainder of the wall of the measuring chamber, wherein the part of the wall of the measuring chamber adjacent to the membrane forms an outer wall with an edge on which the membrane bears, and the membrane has a circumferential bead located on that side of the membrane facing the measuring chamber, characterized in that the bead engages in a recess that is formed in the housing around the outer wall and that extends around the measuring chamber, and protruding pins are arranged in the area of the recess around the outer wall, and holes are provided in the bead of the membrane, such that the pins engage in the holes in the bead of the membrane; and characterized in that a retaining ring is also provided, which engages around the edge of the outer wall of the measuring chamber and which is fixed relative to the housing.

2. The system element as claimed in claim 1, characterized in that the pins are distributed uniformly around the outer wall.

3. The system element as claimed in claim 2, characterized in that the number of pins is at least three.

4. The system element as claimed in claim 3, characterized in that the number of pins is four to twelve, preferably six to ten.

5. The system element as claimed in claim 4, characterized in that eight pins are provided.

6. The system element as claimed in claim 1, characterized in that the pins have a greater length than width in the circumferential direction around the outer wall.

7. The system element as claimed in claim 6, characterized in that the length of the pins is ⅔ of the distance between two pins.

8. The system element as claimed in claim 1, characterized in that the pins protrude coaxially with respect to the outer wall, and the height of the pins is at least half the height of the recess relative to the edge of the outer wall.

9. The system element as claimed in claim 8, characterized in that the height of the pins is ⅔ of the height of the recess relative to the edge of the outer wall.

10. The system element as claimed in claim 1, characterized in that the retaining ring covers at least the gaps between the pins.

11. The system element as claimed in claim 10, characterized in that the retaining ring also at least partially covers the bead of the membrane on the radially outer side thereof.

12. The system element as claimed in claim 11, characterized in that the retaining ring comprises a radial wall section and an axial wall section.

13. The system element as claimed in claim 1, characterized in that the retaining ring is connected to the housing in such a way that the retaining ring cannot be withdrawn from the housing in the axial direction without being destroyed.

14. The system element as claimed in claim 1, characterized in that the retaining ring is connected cohesively to the housing.

15. The system element as claimed in claim 1, characterized in that the retaining ring is connected to the housing by a spreading-in connection.

16. The system element as claimed in claim 1, characterized in that the retaining ring is made of the same material as the housing.

17. The system element as claimed in claim 1, characterized in that preferably two resilient continuations of the housing are also provided on the housing, for the purpose of mechanically coupling the connecting element to the measurement recorder (transducer), and are part of a releasable spreading-in connection that is formed by claw-shaped retaining elements in the form of hooks which are provided on the continuations for engagement in a corresponding groove or undercut of the measurement recorder or of an associated securing means, wherein the system element further comprises a securing ring which has a non-circular configuration, with a first operating position, in which the retaining elements are radially movable about the measuring chamber, such that the system element can be placed onto the measurement recorder or can be removed therefrom, and a second operating position, in which the retaining elements are fixed in a position such that system element and measurement recorder cannot be separated without damage.

18. The system element as claimed in claim 17, characterized in that the securing ring, on its side facing away from the housing, has a protective plate that is connected via predetermined break points to the body of the securing ring and that covers the membrane.

* * * * *